United States Patent [19]

Bencivenni et al.

[11] Patent Number: 5,505,215
[45] Date of Patent: Apr. 9, 1996

[54] METHOD AND DEVICE FOR POSITION CONTROLLING CIGARETTE FILTER PAPER

[75] Inventors: Marco Bencivenni, Bologna; Maurizio Cotti, San Giovanni in Persiceto; Armando Neri, Bologna, all of Italy

[73] Assignee: G.D Societa' Per Azioni, Bologna, Italy

[21] Appl. No.: 196,299

[22] Filed: Feb. 14, 1994

[30] Foreign Application Priority Data

Feb. 17, 1993 [IT] Italy ................. BO93A0048

[51] Int. Cl.⁶ ............................................. A24C 5/60
[52] U.S. Cl. .................. 131/280; 131/905; 131/908; 209/536
[58] Field of Search .................. 131/280, 905, 131/908; 356/390, 398, 425, 433, 435, 445, 448; 382/8; 209/535, 536

[56] References Cited

U.S. PATENT DOCUMENTS 5,392,359  2/1995  Futamura et al. ............. 209/536 X

FOREIGN PATENT DOCUMENTS 807785    1/1959   United Kingdom.
2141229  12/1984   United Kingdom.

Primary Examiner—Jennifer Bahr
Attorney, Agent, or Firm—Marshall, O'Toole, Gerstein, Murray & Borun

[57] ABSTRACT

A cigarette, with a cigarette paper and a filter paper of different colors and separated by a boundary line with a given nominal position, is fed past a pair of optical sensors located on either side of the nominal position of the boundary line. The optical sensors generate a pair of electric signals each related to the color of the respective monitored portion of the cigarette, and which are compared with each other; and, in the event the difference between the signals is below a given threshold value, an error signal is generated for rejecting the cigarette.

9 Claims, 2 Drawing Sheets

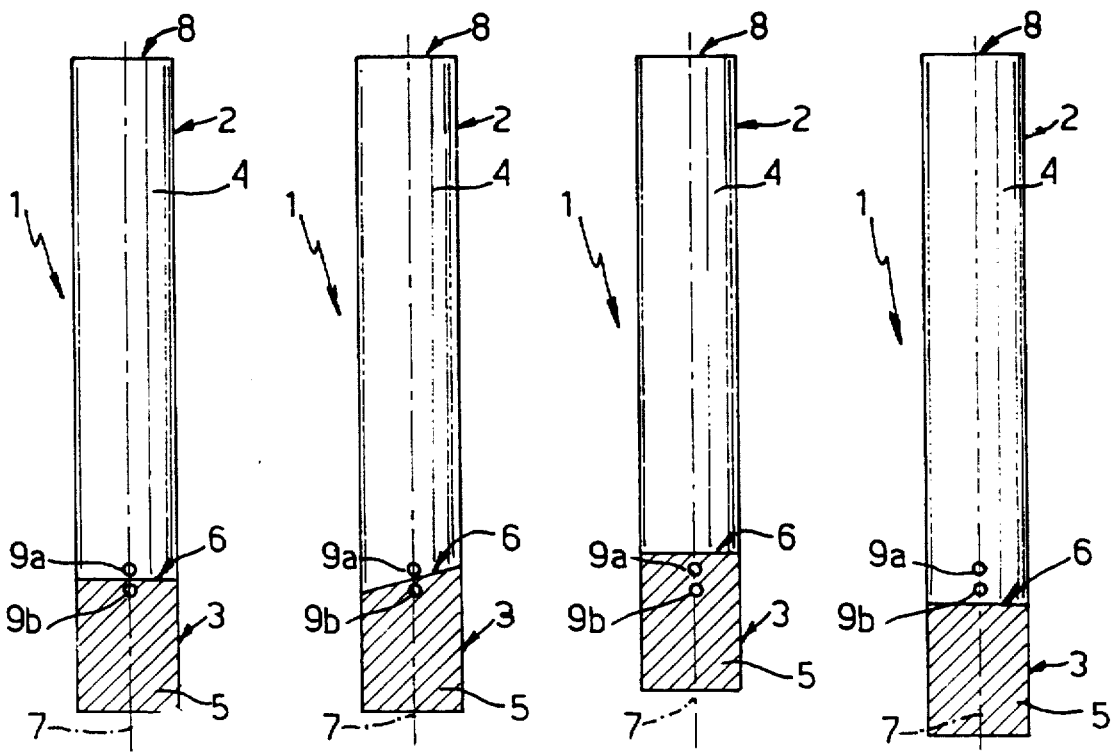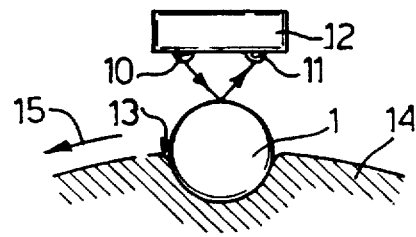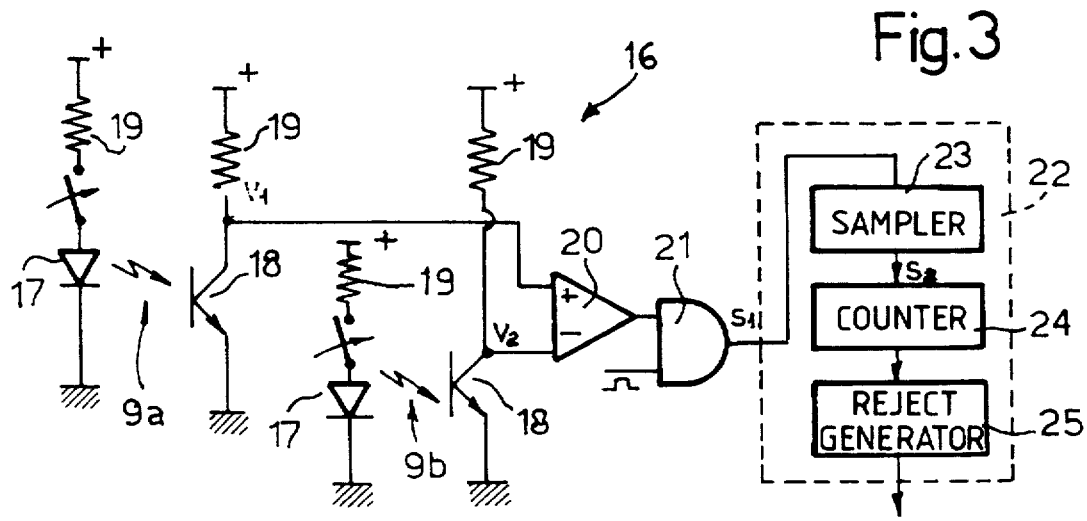

METHOD AND DEVICE FOR POSITION CONTROLLING CIGARETTE FILTER PAPER

BACKGROUND OF THE INVENTION

The present invention relates to a method of controlling the position of cigarette filter paper.

As is known, in the manufacture of filter-tipped cigarettes, following formation of the actual cigarette consisting of normally white paper wrapped about the tobacco, a filter is positioned by way of an extension of the cigarette, and is joined to the cigarette by applying a connecting strip of normally yellow paper (known as "tipping" or "filter paper"). More specifically, the filter paper presents adhesive portions, and is wound about the filter material so as to slightly overlap the cigarette paper and so secure the filter to the cigarette.

When applying the filter paper, however, this is sometimes positioned incorrectly in relation to the actual cigarette portion in the sense that the joining line between the cigarette and the filter is either crooked, or higher or lower than it should be.

As a result, a check must be made to control and indicate any errors in the position of the filter paper in relation to the cigarette.

SUMMARY OF THE INVENTION

It is an object of the present invention to provide a straightforward, reliable method and device for position controlling cigarette filter paper.

According to the present invention, there is provided a method of position controlling the filter paper of cigarettes comprising a cigarette paper and a filter paper of different colours; said cigarette paper and said filter paper being separated by a boundary line having a given nominal position; characterized by the fact that it comprises stages consisting in illuminating two portions of each said cigarette, on either side of said boundary line in said nominal position; receiving reflected light from said portions of said cigarette; converting the received reflected light into electric signals, each related to the colour of a respective monitored cigarette portion; and generating an error signal in the event said electric signals differ by a value below a given threshold.

The present invention also relates to a device for position controlling cigarette filter paper.

According to the present invention, there is provided a device for position controlling the filter paper of cigarettes comprising a cigarette paper and a filter paper of different colours; said cigarette paper and said filter paper being separated by a boundary line having a given nominal position; characterized by the fact that it comprises at least a pair of reflecting optical sensors located along the path of each said cigarette, on either side of said nominal position of said boundary line, and each designed to generate an electric signal related to the colour of a respective monitored cigarette portion; and comparing means for comparing said electric signals and generating an error signal in the event said electric signals differ by a value below a given threshold.

BRIEF DESCRIPTION OF THE DRAWINGS

A non-limiting embodiment of the present invention will be described by way of example with reference to the accompanying drawings, in which:

FIGS. 1a, 1b, 1c and 1d show a cigarette and filter paper in four different relative positions;

FIG. 2 shows a schematic side view of a cigarette following application of the filter and during position control;

FIG. 3 shows an electric diagram of the device according to the present invention;

DETAILED DESCRIPTION OF THE INVENTION

Figure 4A:
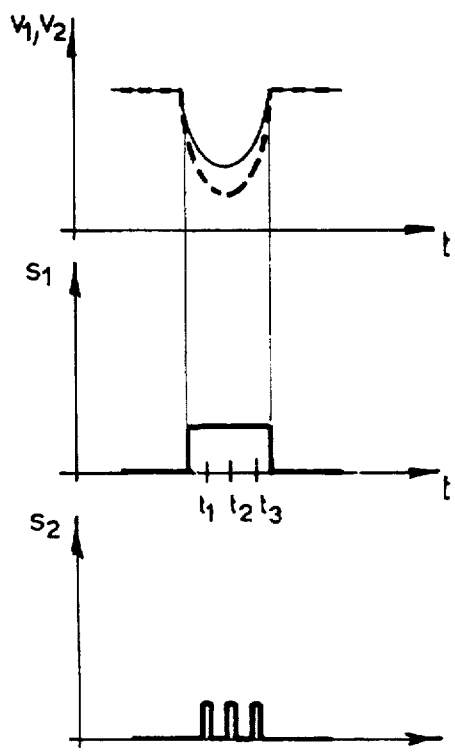
FIGS. 4a, 4b, 4c and 4d show graphs of electric quantities generated by the FIG. 3 device and each corresponding to the relative cigarette-filter positions in FIGS. 1a, 1b, 1c and 1d.

FIGS. 1a, 1b, 1c and 1d show four typical filter paper application situations corresponding respectively to correct positioning and three different types of error.

FIG. 1a, corresponding to correct positioning of the filter paper, shows a cigarette i comprising a cigarette portion 2 and a filter 3. Both cigarette portion 2 and filter 3 present respective papers 4 and 5; and filter paper 5 slightly overlaps cigarette paper 4 so that one edge 6 defines a boundary line between the cigarette and filter. In the event the filter paper is gummed correctly, as shown, boundary line 6 extends perpendicular to the cigarette axis 7, and is located a precise distance from the edge 8 of untipped portion 2.

In FIG. 1b on the other hand, in which the error is exaggerated for reasons of clarity, boundary line 6 slopes in relation to axis 7 due to an error in transportation of filter paper 5 resulting in it being rotated in relation to the correct feed position.

In FIGS. 1c and 1d, due to an error in transportation of filter paper 5 resulting in it being shifted respectively upwards and downwards, boundary line 6 has a correct orientation but is positioned wrongly in relation to edge 8.

According to the present invention, for detecting the errors shown in FIGS. 1b, 1c and 1d, provision is made, along the path of the finished cigarette complete with the filter, for reflecting optical sensors located on either side of boundary line 6 and which provide for generating electric signals related to the colour of the paper.

More specifically, and as shown in FIGS. 1a–1d and FIG. 2, provision is made, along the path of cigarette 1, for two optical sensors 9a, 9b sensitive to variations in colour, and each comprising a light-emitting element 10 and a light-receiving element 11 fitted to a respective support 12.

Each pair of elements 10 and 11 is so located that part of the light emitted by element 10 is reflected on the cigarette—housed inside a seat 13 on a rotary drum 14—and received by respective element 11 as shown in FIG. 2; and elements 10 and 11 of each sensor are aligned along a line coplanar with transportation line 15 of cigarette 1 and with boundary line 6 (in this case, both in the drawing plane).

Sensors 9a, 9b form part of a position control device (FIG. 3) indicated as a whole by 16.

In FIG. 3, the light-emitting elements are represented by appropriately powered light-emitting diodes 17, and the light-receiving elements by phototransistors 18. As shown in FIG. 3, each phototransistor 18 (NPN type) presents a grounded emitter, and the collector connected to the supply via a respective resistor 19. The collectors of phototransistors 18 are also connected to the inputs of a differential amplifier 20, more specifically, phototransistor 18 of sensor 9a to the noninverting input, and phototransistor 18 of sensor 9b to the inverting input of differential amplifier 20.

The output of differential amplifier 20 is connected to one input of an AND circuit 21, another input of which is supplied with a phase signal, e.g. from an encoder associated with drum 14. The output of AND circuit 21 is connected to a microprocessor 22 which, for the sake of simplicity, is represented by a number of operating blocks corresponding to the processing operations performed by microprocessor 22.

More specifically, inside microprocessor 22 are shown a sampling block 23, the input of which is connected to the output of AND circuit 21; a counter 24, the input of which is connected to the output of sampling block 23; and a reject signal generator 25, the input of which is connected to the output of counter 24, and which generates a binary output signal coding the reject condition of the cigarette in the event one of the situations shown in FIGS. 1b, 1c, 1d is detected.

Operation of position control device 16 will now be described with reference also to FIGS. 4a, 4b, 4c and 4d.

When a cigarette with filter paper 5 positioned correctly as shown in FIG. 1a is fed past sensors 9a, 9b, boundary line 6 travels parallel to itself in such a manner that, throughout the monitoring period, sensor 9a detects only the white paper of portion 2, and sensor 9b only the yellow paper of filter 3. As a result, the light generated by light-emitting elements 10 is reflected more greatly by the white cigarette paper 4 than by the yellow filter paper 5 throughout the period in which cigarette 1 is illuminated, i.e. throughout the period in which cigarette 1 is positioned facing the sensors.

In known manner, phototransistors 18 are disabled in the absence of light and, on receiving light, are turned on to an extent depending on the brightness of the light received, thus lowering the voltage at the collector accordingly from a level equal to supply (in the absence of light) to a lower level. More specifically, phototransistor 18 of sensor 9a, facing the white paper throughout the monitoring period, generates a voltage signal v1 at the collector as shown by the dotted line in the FIG. 4a graph; while, by virtue of receiving less light, phototransistor 18 of sensor 9b, facing the yellow paper throughout the monitoring period, generates a voltage signal v2 at the collector as shown by the thin continuous line in FIG. 4a, and which presents a less pronounced minimum level as compared with voltage v1.

Signals v1 and v2 thus present different values practically throughout the monitoring period (corresponding to a given rotation angle of drum 14 and the duration of the phase pulse supplied to AND circuit 21) during which the output of differential amplifier 20 is high. As a result, signal s1 at the output of AND circuit 21 presents a wide positive pulse as shown in the FIG. 4a graph, which signal s1 is sampled by block 23 at definite instants t1, t2, t3 at regular intervals, so that output signal s2 presents three positive samples.

The number of positive pulses (corresponding to a correct relationship between signals v1 and v2) is counted by counter 24 and supplied to reject generator 25 which determines whether the number of pulses counted equals a predetermined value (in the example shown, three) and, if so, supplies for example a low level logic signal as opposed to a reject signal.

Figure 4B:
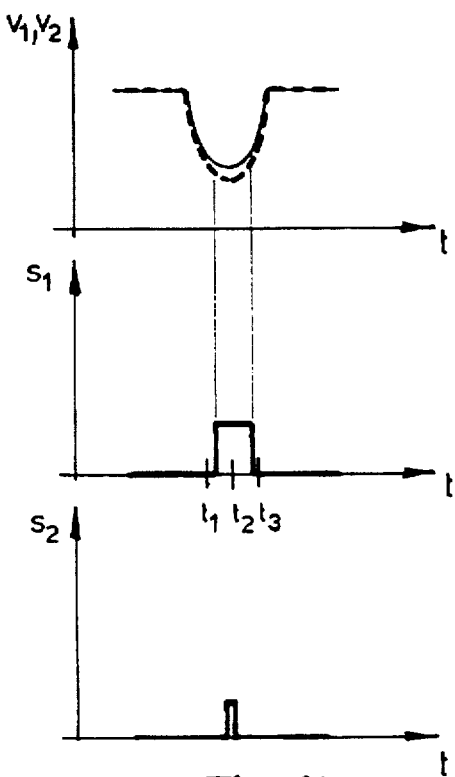
Figure 4C:
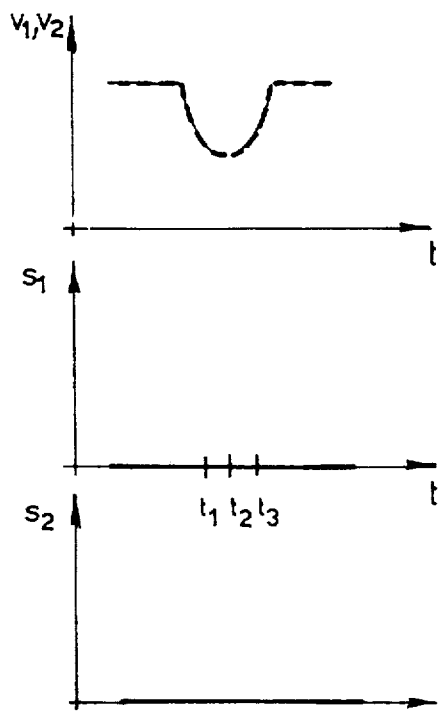
Figure 4D:
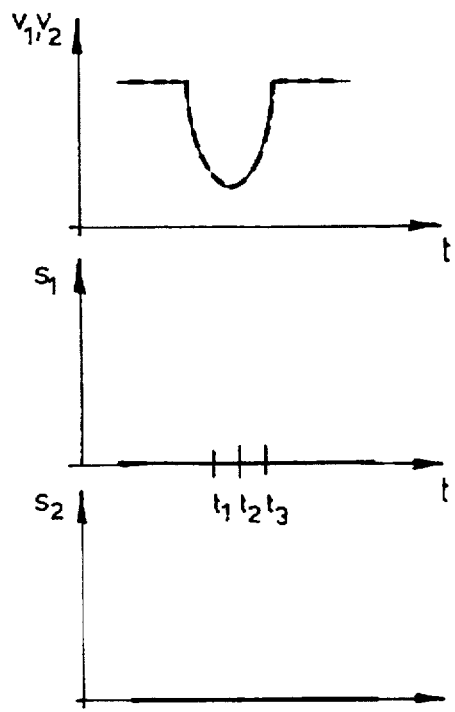

In the event filter paper 5 is inclined as shown in FIG. 1b, both sensors 9a, 9b initially detect the same paper (e.g. the yellow filter paper) so that, during the first part of the monitoring cycle, voltages v1 and v2 are substantially the same (FIG. 4b). Subsequently, sensor 9a begins to detect the white cigarette paper 4, while sensor 9b continues to detect the yellow filter paper 5, thus resulting in differing voltages v1 and v2; and, over the final part of the monitoring cycle, both sensors 9a, 9b again detect the same paper (this time white) so that voltages v1 and v2 are again the same. As a result, the output of differential amplifier 20 is initially low; is only high over the central portion of the monitoring cycle; and finally switches back to low, to give a signal s1 with a narrower pulse than in FIG. 4a. On being sampled, signal s1 gives rise to only one positive sample (signal s2 in FIG. 4b) so that reject generator 25, receiving fewer than the predetermined number of samples, generates a reject signal, e.g. a high logic level signal.

In the case shown in FIG. 1c, both sensors 9a, 9b detect the yellow filter paper 5 throughout the passage of cigarette 1, so that signals v1 and v2 are the same and equal to signal v2 (shown by the thin continuous line) in FIG. 4a. As a result, the output of differential amplifier 20 and the output of circuit 21 (signal s1) remain low, signal s2 comprises no positive samples, and reject generator 25 supplies a reject output signal.

Similarly, in the case shown in FIG. 1d, both sensors 9a, 9b detect the white cigarette paper 4 throughout the passage of cigarette 1, so that signals v1 and v2 are the same and equal to Signal v1 (shown by the dotted line) in FIG. 4a. As a result, the output of circuit 21 (signal s1) remains low, signal s2 comprises no positive samples, and reject generator 25 again supplies a reject output signal.

Consequently, by evaluating the difference between the signals generated by sensors 9a, 9b, it is possible to discriminate between correct and various types of incorrect positioning of the filter paper, despite only a slight difference in the colour of the cigarette and filter papers.

It should be stressed that blocks 23–25 in FIG. 3 are purely indicative, and are preferably implemented by appropriate program steps of microprocessor 22.

We claim:

1. A method of position controlling the filter paper of cigarettes including a cigarette paper and a filter paper of different colors, said cigarette paper and said filter paper being separated by a boundary line having a given nominal position, comprising the steps of: illuminating two portions of each said cigarette, on either side of said boundary line in said nominal position; receiving reflected light from said portions of said cigarette; converting the received reflected light into electric signals, each related to the color of a respective monitored cigarette portion; and generating an error signal in the event said electric signals differ by a value below a given threshold.

2. A method as claimed in claim 1, including moving said cigarette in relation to electronic sensors along a given path so as to be illuminated for a given time interval; generating a differential signal, related to the difference between said electric signals during said given time interval; and generating said error signal in the event said differential signal presents a value below a given value in at least one part of said given time interval.

3. A method as claimed in claim 2, including feeding said cigarette along a path coplanar with said boundary line.

4. A method as claimed in claim 3, including sampling said differential signal in said given time interval, for generating a number of samples; counting the number of samples having a value greater than said given value; and generating a cigarette reject signal in the event said number of counted samples differs from a given number.

5. A device (16) for position controlling the filter paper of cigarettes (1) comprising a cigarette paper (4) and a filter paper (5) of different colors; said cigarette paper and said filter paper being separated by a boundary line (6) having a given nominal position; characterized by the fact that it comprises at least a pair of reflecting optical sensors (9a, 9b) located along the path of each said cigarette, on either side of said nominal position of said boundary line (6), and each designed to generate an electric signal (v1, v2) related to the color of a respective monitored cigarette portion; and comparing means (20–22) for comparing said electric signals and generating an error signal in the event said electric signals differ by a value below a given threshold.

6. A device as claimed in claim 5, characterized by the fact that said comparing means comprise differentiating means (20, 21) for generating a differential signal (s1) related to the difference between said electric signals (v1, v2); and error signal generating means (22) for generating said error signal in the event said differential signal is below a given value.

7. A device as claimed in claim 6, characterized by the fact that said differentiating means comprise a differential circuit (20, 21) having a first and second input connected respectively to a first (9a) and second (9b) optical sensor in said pair, and designed to generate a digital signal (s1) comprising at least one pulse of a first logic level in the event said electric signals (v1, v2) differ by a value greater than said given threshold value.

8. A device as claimed in claim 7, characterized by the fact that said error signal generating means (22) comprise sampling means (23) connected to the output of said differential circuit (20, 21) and designed to generate a number of samples related to the duration of said pulse of said digital signal (s1); and reject signal generating means (24, 25) for generating a cigarette reject signal in the event said number of generated samples differs from a given number.

9. A device as claimed in claim 8, characterized by the fact that said sampling means (23) and said reject signal generating means (24, 25) consist of a microprocessor (22).

* * * * *